United States Patent
Fietz

(10) Patent No.: US 6,584,758 B2
(45) Date of Patent: Jul. 1, 2003

(54) SUPPORTING DISK FOR MOUNTING A ROTOR

(75) Inventor: Roland Fietz, Neustadt (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/923,021

(22) Filed: Aug. 6, 2001

(65) Prior Publication Data

US 2002/0046559 A1 Apr. 25, 2002

(30) Foreign Application Priority Data

Aug. 7, 2000 (DE) ......................................... 100 39 121

(51) Int. Cl.$^7$ ............................................... D01H 4/10
(52) U.S. Cl. .............................. 57/406; 57/404; 57/112; 384/549
(58) Field of Search ...................... 57/112, 404, 406, 57/407; 384/549; 492/48, 49

(56) References Cited

U.S. PATENT DOCUMENTS

| 4,893,946 A | * | 1/1990 | Tesh et al. ................... 384/549 |
| 4,896,976 A | * | 1/1990 | Stahlecker ................... 384/549 |
| 5,221,133 A | * | 6/1993 | Braun et al. ................. 384/549 |
| 5,362,160 A | * | 11/1994 | Braun et al. ................. 384/549 |
| 5,423,616 A | * | 6/1995 | Gotz ........................... 384/549 |
| 5,517,814 A | * | 5/1996 | Stahlecker ................... 57/406 |
| 5,692,369 A | * | 12/1997 | Braun .......................... 57/339 |
| 5,799,478 A | * | 9/1998 | Legrom ........................ 57/406 |
| 5,992,137 A | * | 11/1999 | Wuest .......................... 57/406 |
| 6,016,649 A | * | 1/2000 | Bock et al. ................... 57/406 |
| 6,033,121 A | * | 3/2000 | Stahlecker ................... 384/549 |
| 6,092,357 A | * | 7/2000 | Wassenhoven et al. ....... 57/406 |
| 6,116,012 A | * | 9/2000 | Braun .......................... 57/406 |
| 6,220,761 B1 | * | 4/2001 | Bock et al. ................... 384/549 |
| 6,263,657 B1 | * | 7/2001 | Fietz ........................... 57/406 |
| 2002/0124547 A1 | * | 9/2002 | Fietz ........................... 57/414 |
| 2002/0152737 A1 | * | 10/2002 | Fietz ........................... 57/112 |

FOREIGN PATENT DOCUMENTS

| DE | 4011632 A1 | * 10/1991 | .......... D01H/1/243 |
| DE | 40 19 028 | 12/1991 | |
| DE | 42 27 489 | 3/1994 | |

\* cited by examiner

Primary Examiner—John J. Calvert
Assistant Examiner—Shaun R. Hurley
(74) Attorney, Agent, or Firm—Kenyon & Kenyon

(57) ABSTRACT

A supporting disk for supporting a rotor, in particular the rotor in open-end spinning rotors, having a hub ring and a supporting ring positioned on the outer circumference of the hub ring, having a bearing surface for the rotor, the outer circumference of the hub ring and the inner circumference of the supporting ring being connected to each other with form locking; the supporting ring (3), in cross-section, being formed from a running part (4) provided with bearing surface (10) for the rotor and at least two anchor legs (7, 8) extending from running part (4) and directed radially inwardly as well as axially outwardly.

26 Claims, 6 Drawing Sheets

SUPPORTING DISK FOR MOUNTING A ROTOR

BACKGROUND OF THE INVENTION

1. Field of the Invention

The invention relates to a supporting disk for mounting a rotor, especially an open-end spinning rotor, which is the subject matter of many experiments and designs.

2. Description of Related Art

The high speeds, a given with these rotors at today's maximum of 150,000 rpm at the rotor, having a tendency to ever higher rotational speeds, lead to great heating of the supporting disks, especially of the supporting rings positioned upon them. This heat has to be dissipated, because it is frequently the cause of damage at the supporting ring, which can detach itself from the supporting disk. Therefore, a secure connection between supporting ring and supporting disk is also required.

DE 40 19 028 AII concerns itself with the above named problems, and it has a supporting disk having a groove undercut around its circumference, which accommodates the supporting ring. This anchors the supporting ring to the supporting disk.

Another solution to the problems is contained in DE 42 27 489. In order to avoid the heat generated at the supporting ring, which, in conjunction with the milling work can lead to the detaching of the supporting ring from the hub ring, a different anchoring of the supporting ring to the hub ring is provided. This consists of a profiling by which the supporting ring and the hub ring are connected to each other.

SUMMARY OF THE INVENTION

It is an object of the invention to provide a supporting disk for mounting a rotor, especially an open-end spinning rotor, which includes a hub ring and a supporting ring having a bearing surface for the rotor, positioned on the circumference of the hub ring, the circumference of the hub ring and the inner circumference of the supporting ring being connected to each other by form positive locking. The supporting disk is to be further improved with respect to the heating of the rotor, manifestations of wear and also contamination of the rotor shaft.

In general, it may be determined that the related art leaves unconsidered that, in the case of new machine generations and the development towards ever larger rotational frequencies, not only is the middle region of the supporting ring at risk, but increasingly also the side edge regions. Furthermore, at increasing rotational frequency, rotor shaft contamination plays an ever greater role. It results from particles flying around in the spin box, which reach the rotor shaft by being electrostatically charged and are compacted by the milling effect of the supporting disks. The present invention takes the above points into account by continued good heat dissipation in the middle region of the supporting ring, improved heat dissipation in the edge regions and improved performance with respect to discharging electrostatic loads.

These and other objects of the invention are attained by a supporting disk for supporting a rotor, in particular the rotor in open-end spinning rotors, having a hub ring and a supporting ring positioned on the outer circumference of the hub ring, having a bearing surface for the rotor, the outer circumference of the hub ring and the inner circumference of the supporting ring being connected to each other with form locking, wherein the supporting ring (3), in cross-section, is formed from a running part (4) provided with the bearing surface (10) for the rotor and at least two anchor legs (7, 8) going out from the running part (4) and directed radially inwardly as well as axially outwardly. Thus, as viewed in cross-section, the supporting ring is formed from a moving part provided with the bearing surface for the rotor and at least two anchor legs issuing from the moving part and directed radially inwardly as well as axially outwardly. Such a supporting disk has an extremely simple construction, and good heat dissipation away from the supporting ring is achieved. In addition, hub ring and supporting ring are securely connected to each other.

BRIEF DESCRIPTION OF THE DRAWINGS

The present invention will be described in greater detail with reference to the following drawings wherein.

DESCRIPTION OF THE INVENTION

Figure 1:
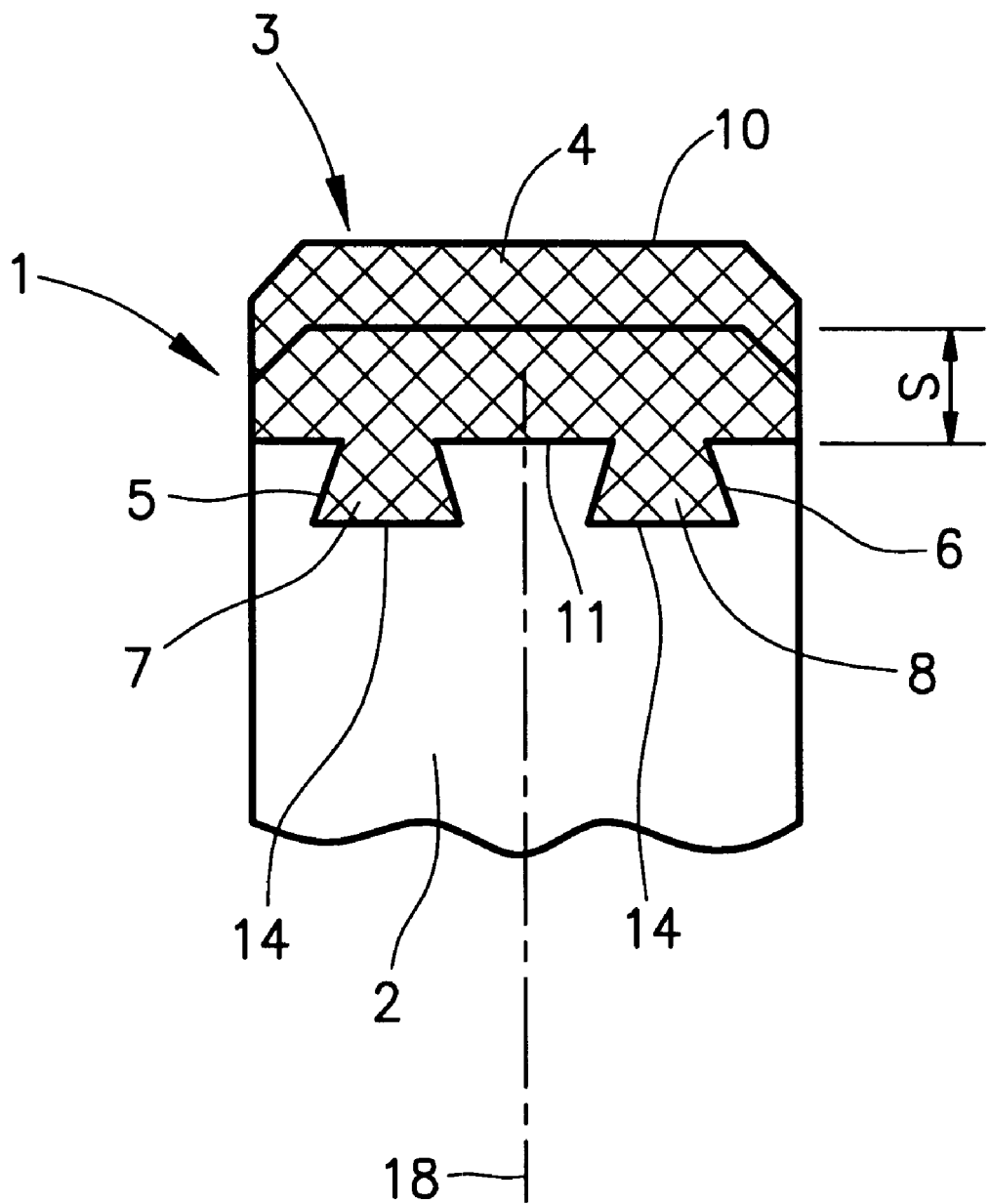
FIGS. 1 through 6 show enlarged the outer region of the supporting disk along with hub ring and support ring in cross-section.

FIG. 1 shows the outer region of a supporting disk 1 enlarged, in cross-section. Supporting disk 1 is made up essentially from hub ring 2 and supporting ring 3 connected to it with form positive locking. Supporting ring 3 is formed from a moving part 4 and two anchor legs 7, 8 going out from it. The anchor legs 7 and 8 are identical and point to the center of hub ring 2. They are each fitted into an encircling and undercut groove 5 and 6 in hub ring 2.

Bearing surface 10 of supporting ring 3 and the inner surface 11 of moving part 4 of supporting ring 3, adjacent to hub ring 2 proceed parallel to each other. The ends of anchor legs 7 and 8 are provided with end surfaces 14 aligned parallel to surfaces 10 and 11 of moving part 4.

Hub ring 2 is made of a metallic material having good heat conductivity, in the present case of aluminum. Supporting ring 3 is made of a plastic having great heat stability, and the plastic is selected in such a way that its shore hardness is less than 96 shore hardness A. This relatively soft plastic allows thickness S of moving part 4 to lie around 2.5 mm. By the constructive formation of hub ring 2, supporting ring 3 and also by the choice of material good dissipation of the generated heat from supporting ring 3 to hub ring 2 is achieved, and indeed in the middle region as well as in the edge regions.

Figure 2:
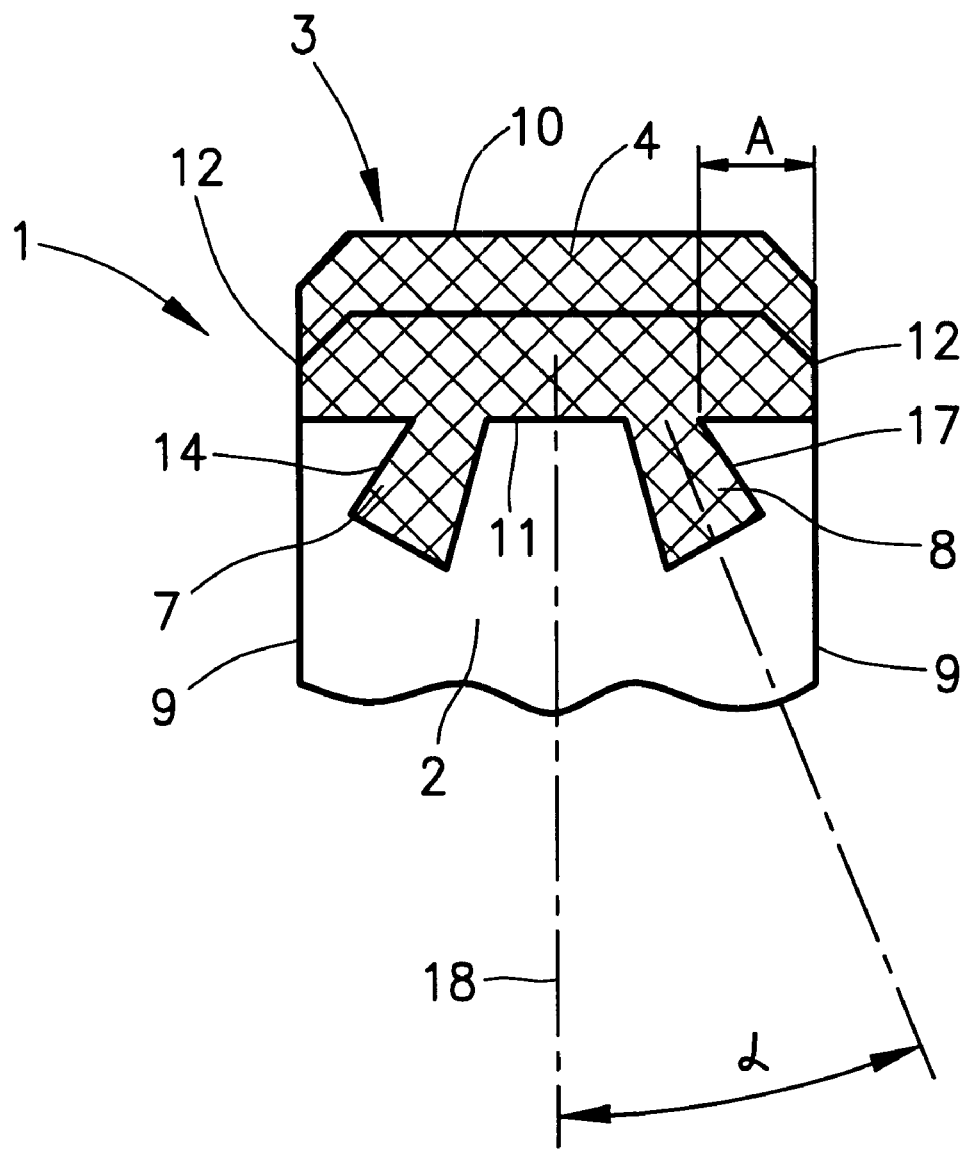

FIG. 2 shows, likewise enlarged, the outer region of hub ring 2. On the outer circumference, ring grooves 16 and 17 are inserted which, as in FIG. 1, are arranged symmetrically to the radial center plane 18 of supporting disk 1, but at an angle α to center plane 18.

In addition, ring grooves 16 and 17 are arranged at a lateral distance A to the side surfaces 9 of hub ring 2. Thereby, the metallic material of hub ring 2 is led directly up to the edge regions of supporting ring 3. The side surfaces 12 of supporting ring 3 are aligned with the side surfaces 9 of hub ring 2. The chosen design results in good support of supporting ring 3 by hub ring 2, and good heat dissipation from the edge regions, as well as improved discharge of electrostatic load on the supporting ring and the rotor shaft, and thus a better performance with respect to contamination of the rotor shaft.

The ring grooves 16 and 17 can be machined very accurately by plunge-cutting. Supporting ring 3 has to be positioned on hub ring 2 by an injection molding procedure.

Figure 3:
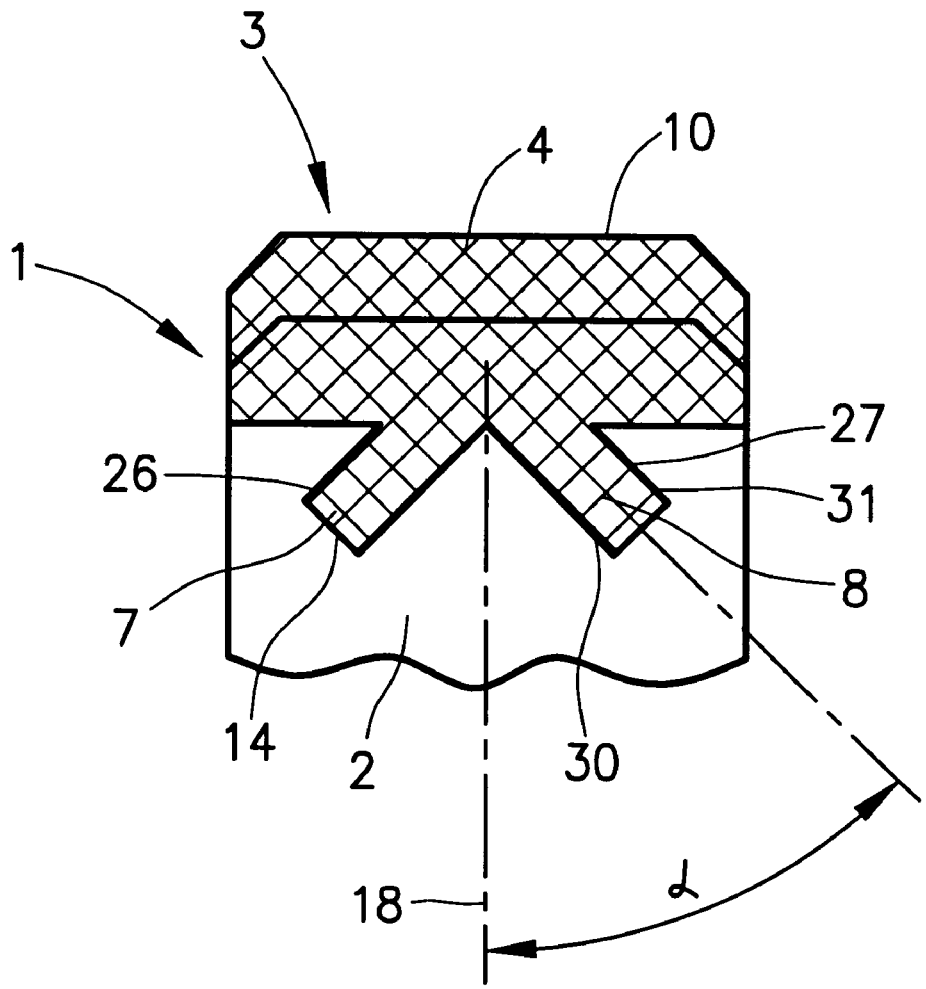
Figure 4:
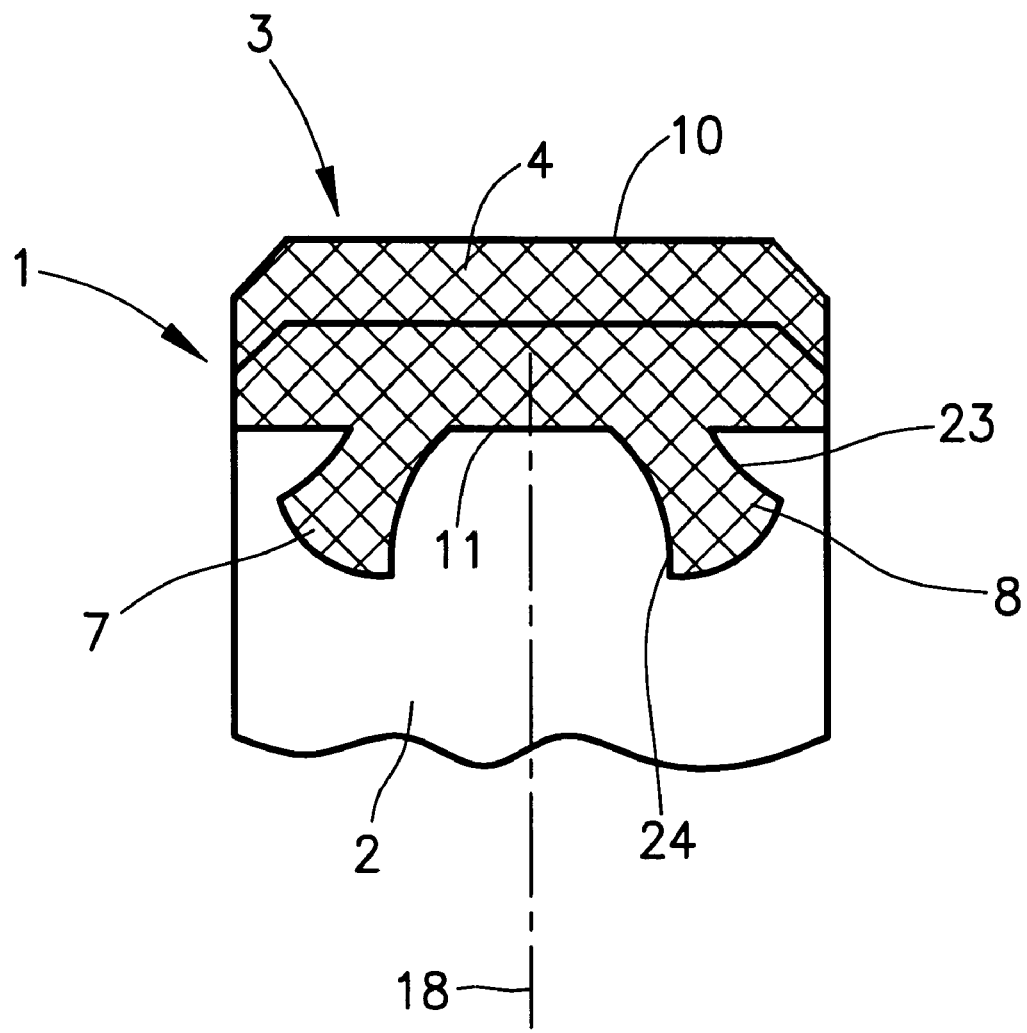
Figure 5:
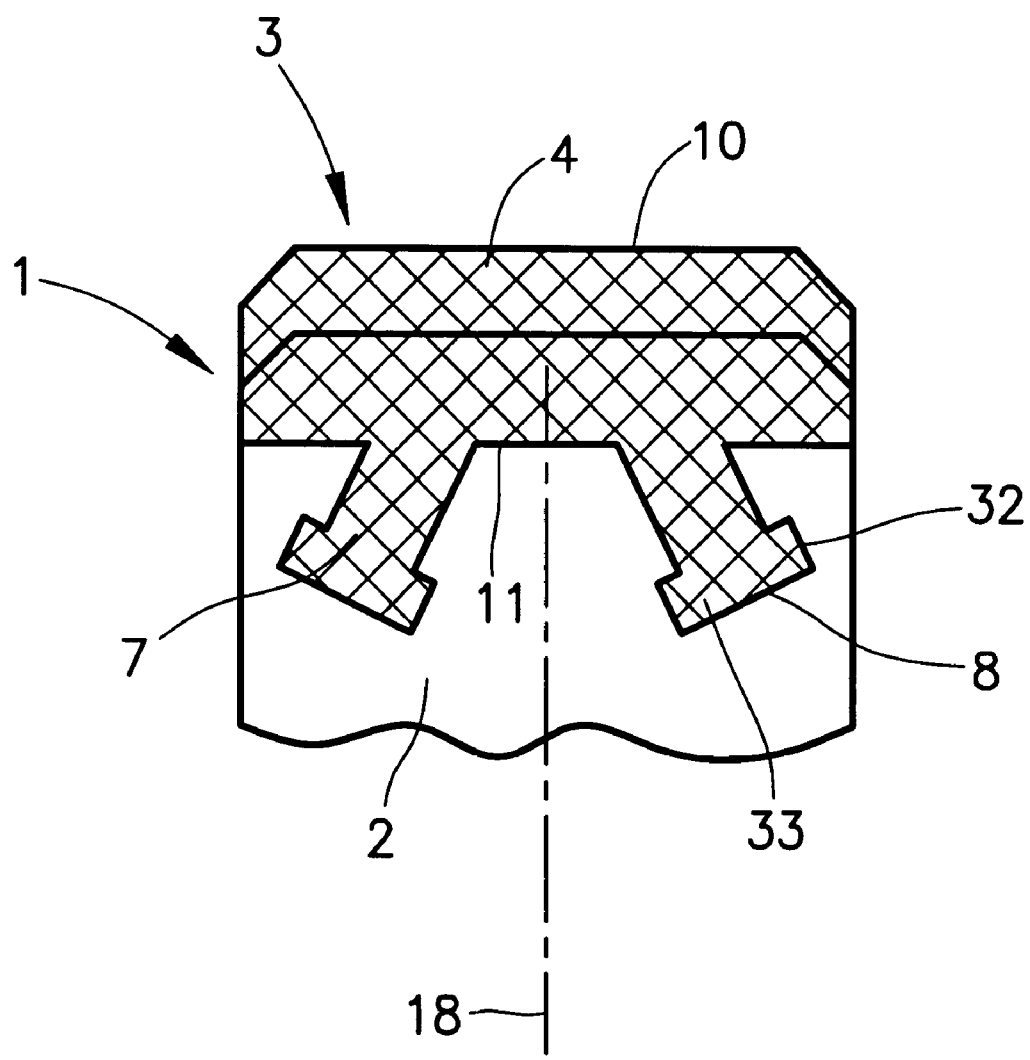
Figure 6:
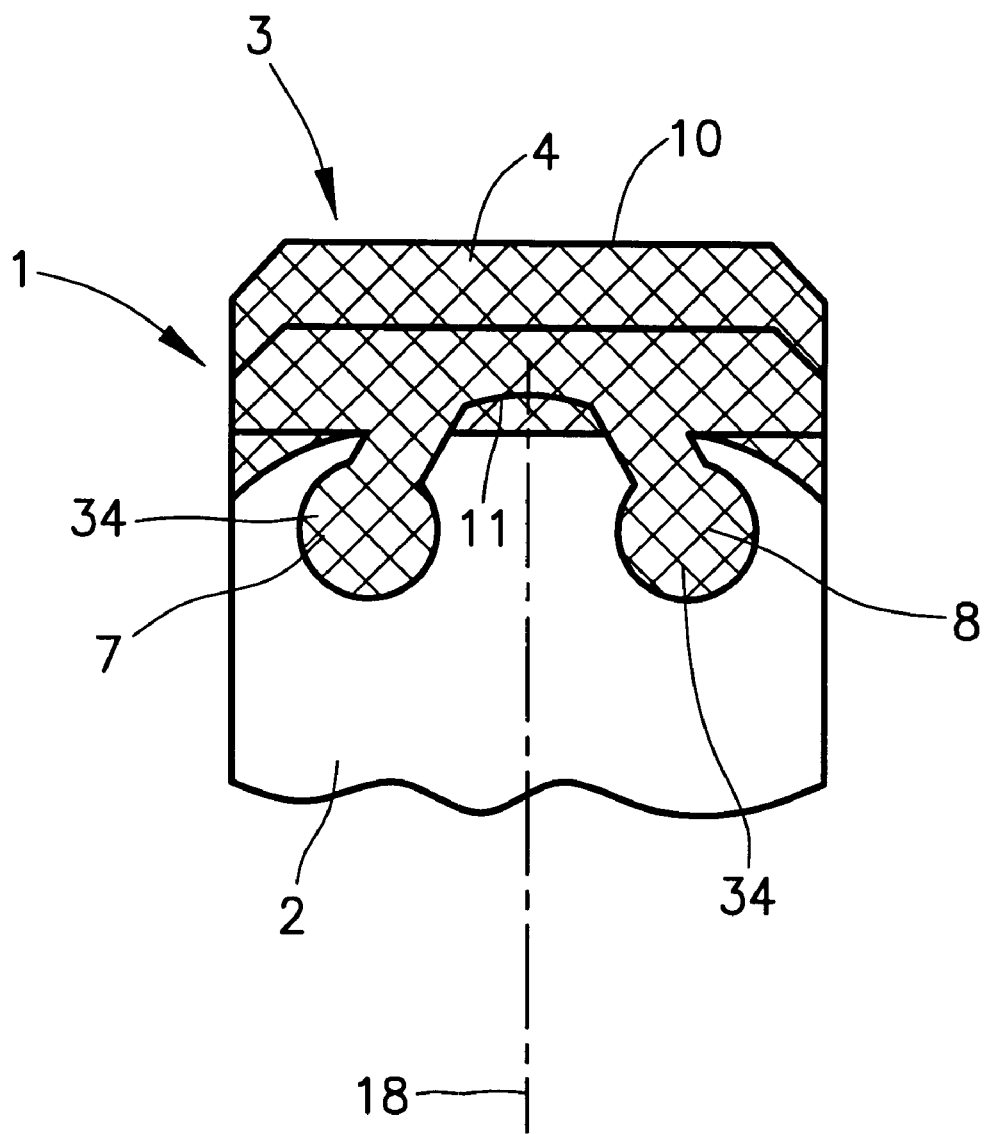

FIG. 3 shows a further supporting ring 3 in cross-section. Grooves 26 and 27 touch each other at the center plane 18. Their angle α is greater than in the example of FIG. 2. The side surfaces 30 and 31 of grooves 26 and 27, and thus, the anchor legs 7 and 8 run parallel to each other. FIGS. 4 to 6 represent variants of the design of anchor legs 7 and 8. Thus, in FIG. 4, the anchor legs 7 and 8 are shown in the form of two laterally bent undercuts 23 and 24.

In FIG. 5, the anchor legs 7 and 8 are used in the form of FIG. 4, but with two lateral undercuts 32, 33. In place of the undercuts, in FIG. 6 curved cavities 34 are provided, which likewise result in good anchoring.

In an expedient manner, the running surface of the supporting ring and the inside surface of the moving part of the supporting ring, which is adjacent to the hub ring, can be aligned parallel to each other. Similarly, the pertinent side surfaces of an anchor leg can proceed parallel to each other. The ends of the anchor legs can be formed to be obtuse and provided with end surfaces aligned preferably perpendicularly to each side surface of the anchor legs.

Other specific embodiments are also conceivable within the framework of the idea of the invention. Thus, the inner surface of the moving part of the supporting ring adjacent to the hub ring can be made concave, and the adjacent surface of the hub ring can be made convex, in order further to support the heat dissipation in the middle of the supporting ring. The anchor legs can also be provided with side surfaces which form additional form positive locking by being provided, in a side view, with the shape of a swallow's tail, or with an undercut, which yield lateral grooves.

As known per se, the hub ring can be made of a metallic material or a heat conductive plastic. The supporting ring, for its part, is made of a polymeric material such as polyurethane. The shore hardness of the polymeric material is less than 98, preferably less than 96 shore hardness A, meaning that a relatively soft polymeric material is chosen for the supporting ring, so that good vibration damping is achieved. As a result, the thickness of the moving part of the supporting ring can be reduced and picked to be below a thickness of 4 mm. A preferred range lies around 2.5 mm.

The anchor legs are aligned at an angle of 10° to 45°, preferably at 38° to the radial center plane of the supporting disk. This achieves a sufficient anchoring of the supporting ring to the hub ring. The hub ring itself is provided on its circumference with two ring grooves which accommodate the anchor legs. The ring grooves are preferably arranged symmetrically to the radial center plane of the supporting disk. They are aligned at the same angle of 10° to 45°, preferably at 38° to the radial center plane of the supporting disk.

The depth of the ring grooves, measured from the circumference of the hub ring in the direction of the axis of rotation, is chosen as equal to, or greater than, the thickness of the anchor legs.

Support for heat dissipation and improved discharge of the electrostatic load of the edge regions of the supporting ring are achieved by arranging the ring grooves of the hub ring at a lateral distance to the side surfaces of the hub ring. In this way, improved heat dissipation and electrostatic discharge from the edge regions of the supporting ring to the hub ring are achieved.

The new supporting disk results in very good heat dissipation, wear of the moving surface is reduced and very favorable damping performance is achieved by the relatively thin coating of relatively soft material. It also became apparent that contamination of the rotor shaft is less than with coatings of greater thickness.

Manufacturing the supporting disk is also simplified in that the hub ring can be produced either by a diecasting or turning method. For example, the ring grooves can be formed in a machining method by plunge-cutting with a cutting tool. The supporting ring can be positioned on the hub ring in an injection molding method. The softer material makes the application of this method possible.

What is claimed is:

1. A supporting disk for supporting a rotor, comprising: a hub ring and a supporting ring positioned on the outer circumference of the hub ring, having a bearing surface for the rotor, the outer circumference of the hub ring and the inner circumference of the supporting ring being connected to each other with form locking, wherein the supporting ring (3), in cross-section, is formed from a running part (4) provided with a bearing surface (10) for the rotor and at least two anchor legs (7, 8) going out from the running part (4) and directed radially inwardly as well as axially outwardly.

2. The supporting disk according to claim 1, wherein the bearing surface (10) of the supporting ring (3) and an inner surface (11), adjacent to the hub ring (3), of the running part (4) of the supporting ring (3) run parallel to each other.

3. The supporting disk according to claim 1, wherein an inner surface (11), adjacent to the hub ring (2) of the running part (4) of the supporting ring (3) is concave and an adjacent surface of the hub ring (2) is convex.

4. The supporting disk according to claim 1, wherein respective side surfaces (30, 31) of anchor leg (7, 8) run parallel to each other.

5. The supporting disk according to claim 1, wherein respective side surfaces (30, 31) of anchor leg (7, 8) have additional form locking in the form of a swallow's tail or as an undercut (32, 33).

6. The supporting disk according to claim 1, wherein the ends of the anchor legs (7, 8) are obtuse and have end surfaces (14) perpendicular to each side surface (26, 27) of the anchor legs (7, 8).

7. The supporting disk according to claim 1, wherein the ends of the anchor legs (7, 8) have a profiling in the form of a rounding.

8. The supporting disk according to claim 1, wherein the hub ring (2) is made of a metallic material which is aluminum.

9. The supporting disk according to claim 1, wherein the hub ring (2) is made of plastic.

10. The supporting disk according to claim 1, wherein the supporting ring (3) is made of a polymeric material.

11. The supporting disk according to claim 10, wherein the shore hardness of the polymeric material is less than 98.

12. The supporting disk according to claim 11, wherein the shore hardness of the polymeric material is less than 96.

13. The supporting disk according to claim 1, wherein the thickness (S) of the running part (4) is less than 4 mm.

14. The supporting disk according to claim 13, wherein the thickness (S) of the running part (4) is less than 2.5 mm.

15. The supporting disk according to claim 1, wherein the anchor legs (7, 8) are aligned at an angle α of 10° to 45° to the radial center plane (18) of the supporting disk (1).

16. The supporting disk according to claim 15, wherein the anchor legs (7, 8) are aligned at an angle α of 38° to the radial center plane (18) of the supporting disk (1).

17. The supporting disk according to claim 1, wherein the hub ring (2) is provided with two ring grooves (5, 6; 16 17; 26, 27), which accommodate the anchor legs (7, 8).

18. The supporting disk according to claim 17, wherein the ring grooves (5, 6; 16, 17; 26, 27) are arranged symmetrically to the radial center plane (18) of the supporting disk (1).

19. The supporting disk according to claim 17, wherein the ring grooves (5, 6; 16, 17; 26, 27) are aligned at an angle α of 10° to 45° to the radial center plane (18) of the supporting disk (1).

20. The supporting disk according to claim 19, wherein the ring grooves (5, 6; 16, 17; 26, 27) are aligned at an angle α of 38° to the radial center plane (18) of the supporting disk (1).

21. The supporting disk according to claim 17, wherein the depth of the ring grooves (5, 6; 16, 17; 26, 27) as measured from the outer circumference of the hub ring (2) in the direction of the axis of rotation of the supporting disk (1) is equal to or greater than the thickness of the anchor legs (7, 8).

22. The supporting disk according to claim 17, wherein the ring grooves (5, 6; 16, 17; 26, 27) are arranged at a lateral distance (A) from side surfaces (9) of the hub ring (2).

23. The supporting disk according to claim 1, wherein the hub ring (2) is machined using a turning operation.

24. The supporting disk according to claim 1, wherein the hub ring (2) is made of plastic in an injection molding, fluid or extrusion process.

25. The supporting disk according to claim 17, wherein the ring grooves (5, 6; 16, 17; 26, 27) are machined by plunge-cutting using a cutting tool.

26. The supporting disk according to claim 1, wherein the supporting ring (3) is positioned on the hub ring (2) in a fluid, centrifugal casting or extrusion process.

* * * * *